United States Patent [19]

Duffy et al.

[11] 4,082,703
[45] Apr. 4, 1978

[54] POLYURETHANE PREPOLYMERS, REBONDED POLYURETHANE FOAM AND METHODS OF FORMING THE SAME

[75] Inventors: Robert Donovan Duffy, Summersville; Eldon Charles Stout, South Charleston, both of W. Va.

[73] Assignee: Union Carbide Corporation, New York, N.Y.

[21] Appl. No.: 673,808

[22] Filed: Apr. 5, 1976

Related U.S. Application Data

[63] Continuation-in-part of Ser. No. 565,950, Apr. 7, 1975, abandoned.

[51] Int. Cl.$^2$ ............... C08G 18/14; C08G 18/48; C08G 18/76
[52] U.S. Cl. ............... 260/2.5 BE; 260/2.5 AD; 260/2.5 AK; 260/2.5 AP; 260/2.5 AT; 260/77.5 AP
[58] Field of Search ............... 260/2.5 AK, 2.5 AD, 260/2.5 AP, 2.5 BE, 2.5 AT, 77.5 AP

[56] References Cited

U.S. PATENT DOCUMENTS

| 2,674,619 | 4/1954 | Lundsted | 260/485 |
| 2,726,219 | 12/1955 | Hill | 26/2.5 |
| 2,977,330 | 3/1961 | Brower | 260/2.5 |
| 3,072,582 | 1/1963 | Frost | 260/2.5 |
| 3,114,722 | 12/1963 | Einhorn et al. | 260/2.5 AK |
| 3,115,481 | 12/1963 | Pigott et al. | 260/77.5 |
| 3,169,934 | 2/1965 | Dennett et al. | 260/2.5 |
| 3,189,578 | 6/1965 | Kiremmerer | 260/77.5 |
| 3,268,488 | 8/1966 | Heiss | 260/77.5 |
| 3,386,962 | 6/1968 | Damusis | 260/77.5 |
| 3,391,196 | 7/1968 | Earing et al. | 260/615 |
| 3,401,128 | 9/1968 | Terry | 260/2.5 AK |
| 3,489,698 | 1/1970 | Morehouse | 260/9 |
| 3,558,529 | 1/1971 | Whitman et al. | 260/2.5 |
| 3,594,352 | 7/1971 | Lloyd et al. | 260/77.5 |
| 3,600,340 | 8/1971 | Patton et al. | 260/2.5 BE |
| 3,637,865 | 1/1972 | Haring | 260/611.5 |
| 3,639,355 | 2/1972 | Wooster et al. | 260/77.5 AP |
| 3,689,442 | 9/1972 | Taub | 260/9 |
| 3,706,714 | 12/1972 | Lloyd et al. | 260/77.5 AP |
| 3,983,094 | 9/1976 | O'Shea | 260/77.5 AM |
| 3,985,688 | 10/1976 | Speech | 260/2.5 AP |

OTHER PUBLICATIONS

BASF-Wyandotte Corp. Data Sheet "Tetronic Series of Non-Ionic Surfactants", 1968.
Saunders et al., Polyurethanes Part I. Interscience, New York (1962), pp. 36, 37, 58.
Vieweg-Höchtlen, "Polyurethane", Kunststoff Handbuch, Band VII, Carl Hanser, Munich, 1966, pp. 60-72.

Primary Examiner—H.S. Cockeram
Attorney, Agent, or Firm—Eugene C. Trautlein

[57] ABSTRACT

This invention relates to novel polyurethane prepolymers which consist essentially of the reaction product of a polyoxyalkylene polyol having a critical oxyethylene content and an isocyanate constituent, the reaction product having a defined level of free NCO. Particularly useful prepolymers are produced using a tolylene diisocyanate residue. The prepolymers provided have outstanding utility for rebonding polyurethane foams for applications such as, for example, carpet underlays and allow significant reductions in the adhesive level used in forming such rebonded foams and in the demolding cure times in comparison with presently used prepolymer adhesives. The prepolymers are also useful for applications in which polyurethane prepolymers are used presently such as, for example, in hydrophilic foams.

21 Claims, No Drawings

POLYURETHANE PREPOLYMERS, REBONDED POLYURETHANE FOAM AND METHODS OF FORMING THE SAME

RELATED APPLICATION

Duffy et al., Ser. No. 565,950, filed: Apr. 7, 1975, for: Polyurethane Prepolymers, Rebonded Polyurethane Foams and Methods of Forming Rebonded Polyurethane Foams, now abandoned the present application being a continuation-in-part thereof.

BACKGROUND OF THE INVENTION

A substantial amount of the materials used for carpet underlay are formed from, what is termed, rebonded urethane foam. Rebonded urethane foam is the product obtained when small, shredded particles, e.g. — one-half inch cube in size, of a flexible urethane foam are coated with a thin layer of a prepolymer adhesive and compressed until the adhesive cures sufficiently to maintain the particles of urethane foam in the compressed state, i.e. — the product has dimensional integrity or stability.

In manufacturing rebonded urethane foam, typically, the shredded, small particle urethane foam is placed in a suitable mixing container, such as a ribbon blender, where the foam particles are subjected to vigorous mixing. As the shredded foam particles are being agitated, the prepolymer adhesive is sprayed into the mixing chamber where it coats the particles of scrap, flexible urethane foam. Water may also be added to the mixing chamber before the prepolymer is added, at about the same time the prepolymer is added, or after addition of the prepolymer. The water may or may not contain a catalyst to promote the curing of the prepolymer adhesive. After the shredded foam and prepolymer mixture are thoroughly blended, the mixture is transferred from the mixer to a mold and compressed (if a batch process is being used) or to continuosly moving compression conveyors (when the process is "continuous"). In either case, the mixture is held in the compressed state until the shredded foam/prepolymer block achieves dimensional stability. It is this compressed block of shredded foam/reacted prepolymer which is identified as "rebonded urethane foam". This rebonded urethane foam may then be fabricated into whatever shape is required for the particular intended end use application.

Typically, the prepolymers which have been used for such rebonded foam applications comprise the reaction product of an isocyanate such as tolylene diisocyanate with a polyol such as a polyoxypropylene polyol which may contain minor amounts of ethylene oxide on the order of about 15% or less. Prepolymers of this type suitably function to yield the desired rebonded urethane foam product. However, the economy of the manufacture of the rebonded foam product is dependent to a significant extent upon the amount of the prepolymer adhesive which must be used, the time needed to cure the prepolymer adhesive and the time before the rebonded polyurethane foam can be "demolded" (i.e. — removed from the mold).

OBJECTS

It is an object of the present invention to provide novel prepolymer compositions which allow economies in the manufacture of rebonded urethane foam.

A further and more specific object provides prepolymer compositions which may be formed from tolylene diisocyanate residue blended with tolylene diisocyanate.

A still further object lies in the provision of prepolymer compositions which can be cured in relatively short periods of time.

Yet another object of this invention is to provide prepolymer compositions which allow rebonded urethane foam to be made with relatively small amounts of the prepolymer composition.

Still another object of the present invention provides prepolymer compositions that minimize the demolding time required in the manufacture of rebonded urethane foam.

Another object of this invention is to provide prepolymer compositions which exhibit improved stability upon storage.

A further object provides prepolymer compositions which are homogeneous solutions which minimize processing problems.

A still further object lies in the provision of prepolymer compositions which allow the manufacture of lower density rebonded urethane foams from a particular starting foam source.

Yet another object of this invention is to provide novel rebonded urethane foams and a method of preparation thereof.

Other objects and advantages of the present invention will become apparent in the following description.

SUMMARY OF THE INVENTION

In general, the present invention is predicated on the discovery that prepolymer compositions exhibiting outstanding properties for applications such as an adhesive for rebonding polyurethane foams are provided by the reaction product of an isocyanate constituent consisting of tolylene diisocyanate residue, tolylene diisocyanate, diphenylmethane diisocyanate, polymethylene poly(phenyleneisocyanate), and blends thereof, with a polyoxyalkylene polyol containing between about 30 to 100 percent by weight of oxyethylene and a free NCO content in the range of from about 2 to about 20 percent by weight, with the proviso that when the oxyethylene content of the polyol is 100 percent by weight the isocyanate is other than tolylene diisocyanate or diphenylmethane diisocyanate. Particularly useful and preferred prepolymer compositions are formed when tolylene diisocyanate residue blended with tolylene diisocyanate is employed. The novel prepolymer compositions of this invention, except when diphenylmethane diisocyanate is used, are homogeneous solutions.

This invention further provides rebonded polyurethane foams utilizing certain prepolymer compositions as well as a method for forming such rebonded urethane foams. More particularly, this invention also provides a rebonded polyurethane foam comprising a block of foam particles having dimensional stability and said particles being bonded together by a cured polyurethane prepolymer, said prepolymer consisting of the reaction product of (a) an isocyanate selected from the group consisting of tolylene diisocyanate, tolylene diisocyanate residue, diphenylmethane diisocyanate, polymethylene poly(phenyleneisocyanates), and blends thereof and (b) a polyoxyalkylene polyol having an oxyethylene content of from about 30 to 100 percent by weight, said prepolymer having a free NCO content, prior to curing, of from about 2 to 20 percent by weight.

DETAILED DESCRIPTION

The polyoxyalkylene polyol constituent should contain a range of oxyethylene content which yields a homogeneous prepolymer solution. By a homogeneous prepolymer solution, it is meant that, by visual inspection, the prepolymer compositions are clear and solids free or contain so little solids content that homogeneous solutions can be obtained by conventional filtration, as will be hereinafter described. The homogeneity is generally determined at ambient or room temperature conditions since, if the prepolymer solution is not homogeneous at such conditions, it will not be homogeneous at elevated temperatures. However, as will be pointed out hereinafter, when the prepolymer is a solid at ambient temperatures, it is sufficient if the prepolymer is homogeneous at the temperatures at which it is a liquid. In the manufacture of rebonded urethane foam, it appears that the rate of prepolymer cure is directly proportional to the oxyethylene content of the polyol utilized in preparing the prepolymer composition. Thus, the higher the oxyethylene content of the polyol, the faster the rate of prepolymer cure that has been observed.

The range of the polyol oxyethylene content that can appropriately be utilized depends upon whether the prepolymer composition is formed at room temperature or an elevated temperature. When room or ambient temperatures are employed to form the prepolymer compositions of this invention, it has been found desirable to maintain the oxyethylene content in the range of from about 30 to about 80 percent to provide homogeneous prepolymer solutions. As the oxyethylene content is decreased below 30 percent, the prepolymers begin to lose their homogeneous character after short storage periods. Indeed, when polyols having oxyethylene contents of 20 percent are used, the prepolymers formed are non-homogeneous from the outset. In high molecular weight polyether polyols, (e.g. — having hydroxyl numbers in the range of 30-60), which may typically be used for the manufacture of these prepolymer compositions for rebonded foam applications, oxyethylene contents above about 70 percent tend to provide prepolymer compositions which are hazy or solid at room temperature and have high freezing point values, making the materials undesirable for storage and use in cold winter temperatures. Accordingly, the preferred range of polyol oxyethylene content for room temperature prepolymer preparation lies in the range of from about 40 to about 70 percent.

When elevated reaction temperatures are used in the preparation of the prepolymer compositions, the range of the oxyethylene content of the polyol which will yield homogeneous prepolymer solutions at the reaction temperature utilized lies in the range of from about 30 to about 100 percent. The preferred range for elevated temperature preparation is from about 40 to about 70 percent, however, for the reasons discussed herein in connection with room temperature prepared prepolymers. Thus, polyoxyethylene polyols that are solid at room temperature may be utilized and will form homogeneous prepolymer solutions at the elevated reaction temperatures employed. These are not preferred since the resulting prepolymers will become solid upon storage at room temperature.

The positioning of the oxyethylene units in the polyol is not believed to be critical. Accordingly, the polyoxyalkylene polyol can contain either internal ethylene oxide or the polyol can be capped with the necessary ethylene oxide content.

The hydroxyl number of the polyol constituent can vary within wide limits, depending upon the specific end use application contemplated. Suitably, the hydroxyl number may range from about 25 or perhaps 20 to about 650. For most applications, including rebonding urethane foams, it is preferred to maintain a hydroxyl number range of from 30 to 60, and most preferably from 30–40. As can be appreciated, lower hydroxyl numbers are preferred since the amount of the isocyanate constituent needed for the prepolymer will correspondingly be reduced, resulting in a more economical operation.

The functionality and molecular weight of the polyol are not critical and may be selected so as to provide the polyol with the desired hydroxyl number. With respect to the polyol functionality, diols and triols will be typically employed but functionalities up to six and even higher certainly may be used if desired. With the hydroxyl number desired and the functionality selected, the needed molecular weight will, as is known, be set. In rebonded foam applications, with typical hydroxyl numbers desired, the polyols used will have molecular weights ranging from 2,000 to 5,000, depending upon whether a diol or triol is involved.

The polyoxyalkylene polyol constituent may be prepared using conventional procedures which, as is known, include reacting either a mixture of an alkylene oxide such as propylene oxide and ethylene oxide or sequentially feeding the subject oxides to a hydroxyl containing starter in the presence of a catalyst, such as potassium hydroxide. This crude product may then be refined by any method, principally to remove the catalyst. Suitably, for example, the crude polyol can be treated with magnesium silicate, stabilized with 2,6-ditert-butyl-4-methylphenol, filtered, and then stripped free of volatiles. For optimum prepolymer reaction characteristics, is has been found desirable to maintain the water content less than about 0.4 weight percent, preferably below about 0.1 weight percent. While higher water contents in the polyol do not prevent the formation of a satisfactory prepolymer, such higher water contents can result in the formation of a significant amount of carbon dioxide and urea which may cause handling problems during the manufacture of the prepolymer compositions. While propylene oxide is preferred for use in forming the polyol constituent, other alkylene oxides such as butylene oxide could be employed if desired.

The isocyanate constituent employed in forming the novel prepolymers of this invention can range, in one embodiment, from tolylene diisocyanate residue to pure tolylene diisocyanate. As is known, tolylene diisocyanate is commercially made by reacting toluene and nitric acid to form the 2,4- and 2,6-dinitrotoluene isomers, hydrogenating and then phosgenating, typically in a solvent such as dichlorobenzene, to provide the conventional mixture of 80 percent 2,4-tolyene diisocyanate and 20 percent 2,6-tolylene diisocyanate. After removal of the solvent, the crude product undergoes a further evaporation in a still, with the refined or pure tolylene diisocyanate coming over. The evaporator tails remaining are black in color and extremely viscous, even often solid, materials. It is the evaporator tail material which is defined by the terminology used herein, as a tolylene diisocyanate residue.

If desired, and while not preferred, the tolylene diisocyanate residue may be employed, as has been discussed, as the isocyanate constituent for the novel prepolymers. When employed, due to processing problems, it may be desirable to reduce the viscosity by incorporating a suitable solvent such as methylene chloride. The tolylene diisocyanate residue should be allowed to age before usage by storage for an extended period of time, e.g. — up to about one month or even longer. During this storage period, as is known, some chemical rearrangement is believed to occur; and the viscosity initially increases rather significantly. Sufficient aging is achieved when the increment of the viscosity increase begins to level off.

The preferred isocyanate constituent is formed by blending the aged tolylene diisocyanate residue with commercially pure tolylene diisocyanate in varying amounts. Prepolymers formed from such blends provide both economy as well as outstanding properties in rebonded foam applications as compared with pure tolylene diisocyanate. Suitable blends are commercially available; and, for purposes of forming the prepolymers, the amount of pure tolylene diisocyanate used is not critical. While the weight percent of the tolylene diisocyanate in the blend can, of course, be varied as desired, particularly useful blends are formed when the tolylene diisocyanate used is from about 33 to 67 weight percent.

As should be appreciated, somewhat differing results are achieved depending upon the character of the tolylene diisocyanate residue used. It is preferred to employ residues that are homogeneous in character, as visually evidenced by the lack of solids present. Residues containing some solids can be used but result in prepolymers which retain these solids. Homogeneous prepolymer solutions can, however, sometimes be provided by filtering the resulting prepolymers; and the solids content of such prepolymers should be distinguished from the extent of solids in prepolymers formed from residues and polyols not within the scope of this invention which cannot be easily and economically filtered to provide homogeneous prepolymer solutions. Thus, as is known, it is conventional in commercial operations to employ filters such as, for example, cone filters. To be useful in such applications, the prepolymers should not plug or foul the filters. Whether appropriate filtration can provide a satisfactorily homogeneous solution can be determined by using a conventional laboratory pressure filter. If the prepolymer containing solids can be processed through such a pressure filter to remove the solids, the resulting prepolymer can be considered to be within the present invention.

In addition, the isocyanate constituent may also be diphenylmethane diisocyanate (MDI) or poly(phenyleneisocyanates) (polymeric MDI). When polymeric MDI is utilized, the resulting prepolymer is not homogeneous. Conventional filtration of the polymeric MDI before the prepolymer is made (i.e. — pre-filtration) allows preparation of a prepolymer which, when first prepared, is essentially free of solids; but solids or sediment develop upon standing at room temperature. If, however, the prepolymer is filtered after being made (i.e. — post-filtration) the fitered prepolymer remains a clear, black homogeneous liquid, even when stored at room temperature for three weeks. Accordingly, when polymeric MDI is employed, at least a post-filtration should desirably be employed. However, the other isocyanate constituents are generally preferred in relation to polymeric MDI due to the superior performance in rebonding polyurethane foams.

MDI may also be suitably employed as the isocyanate constituent and is unique in that a homogeneous prepolymer solution does not result, regardless of whether filtration is employed. The character of MDI prepolymers remains essentially the same regardless of the oxyethylene content, i.e. — a white slush which is relatively stable insofar as phase separation is concerned. MDI prepolymers made with polyols having oxyethylene contents less than 30% are not preferred, however, since such prepolymers are relatively inferior when employed as an adhesive for rebonding foams. Because of the lack of homogeneity of MDI prepolymers, their use is not preferred in applications where fouling of rebonding apparatus can readily occur, e.g. — in apparatus which includes filtering means. However, in applications where fouling will not present a problem, MDI prepolymers can be employed and possess outstanding utility for rebonding polyurethane foams.

Blends of any of the isocyanate constituents may also be employed if desired. In addition to blends of tolylene diisocyanate and tolylene diisocyanate residue, particularly useful blends include blends of tolylene diisocyanate and polymeric MDI with tolylene diisocyanate contents of from 40 to 60 weight percent, based upon the total weight of the blend. As will be apparent from the prior discussion, depending upon the blend utilized, filtration may be desirable to provide homogeneity for the resulting prepolymer or use may preferably be restricted to non-fouling applications when significant amounts of MDI are employed.

To form the prepolymer compositions of the present invention, the polyol and isocyanate constituents can be mixed together in a reaction vessel at either room or elevated temperatures, and with or without a catalyst. Suitably, for example, when elevated temperatures are employed, the isocyanate constituent can be charged to the reaction vessel and heated; and the polyol may then be thereafter fed at a rate to maintain the desired reaction temperature. Suitable catalysts include any of the many known catalysts for catalyzing isocyanate-polyol reactions such as organotin compounds such as dialkyltin salts of carboxylic acids, e.g. — dibutyltin diacetate, dibutyltin dilaurate, dibutyltin maleate, dilauryltin diacetate, dioctyltin diacetate, and the like. Stannous octoate and the like and tertiary amines such as bis(dimethylaminoethyl)ether are further suitable representative examples. Typically, the catalyst may suitably be employed in small amounts, for example, from about 0.0001 percent to about 5 percent based upon the weight of the reaction mixture, most typically 0.001 to 0.020. If a catalyst is to be used, it may be blended with the polyol or alternatively, added to the reaction mixture in the reaction vessel. After all the constituents are completely mixed, the reaction is allowed to proceed until the generation of prepolymer is complete, as is evidenced by the visual prepolymer clarity or stabilized viscosity or free isocyanate (NCO) content characteristics. At room temperatures, the reaction time may vary from about 3 days when no catalyst is employed to about 1 day when a catalyst is employed. At elevated reaction temperatures, e.g. — 50° C., the prepolymer generation reaction will typically be complete in less than about 5 hours when no catalyst is present. As will be appreciated, elevated temperature should be employed when the polyol constituent is normally solid at ambient temperatures. Also, when ambient or room temperatures are used, it is necessary to utilize intimate or vigorous mixing, such as can be achieved by conventional mixing apparatus providing high shear.

With respect to the relative amounts of the polyol and isocyanate constituents, the ratio employed should, from the functional standpoint, provide a prepolymer with the lowest free NCO content that will perform satisfactorily in the intended end use application. Typically, the free NCO content can suitably vary from about 2 to about 20 percent. As the free NCO content of the prepolymers of this invention is decreased to approach the minimum, the prepolymers tend to become unstable, as evidenced by significant viscosity increases in storage. Prepolymers employing free NCO contents approaching the upper limit of the range tend to allow formation of undesirable lower molecular weight compounds such as ureas which adversely affects the adhesive properties of the prepolymers. Most preferably, when the prepolymer composition is to be used for rebonding urethane foam, the free NCO content will be in the range of from about 5 to 10 percent. The optimum content that has been observed for this application is about 10 percent because of the faster curing times achieved in comparison to prepolymers containing lower free NCO content. While higher free NCO content prepolymers than those set forth herein can perhaps suitably be used, it should be appreciated that this is generally undesirable due to the loss of more free isocyanate into the atmosphere.

If desired, a diluent may be added to the prepolymer in amounts necessary to reduce the viscosity to whatever level is required. Any diluent may be utilized so long as, of course, no significant adverse effects are caused in the particular end use application. As an illustrative example, methylene chloride has been found to be a satisfactory diluent.

In forming the novel rebonded urethane foams of this invention, the process described hereinbefore may be utilized. Thus, the polyurethane foam, generally scrap, is comminuted or shredded into relatively small particles in conventional apparatus such as a grinder. The particle size of the shredded foam is not critical and will vary depending upon the type of grinding used. Uniformity of particle size is not needed, and a typical shredded foam may contain particles smaller than 1/16 of an inch or smaller up to particles having at least one dimension perhaps 2 inches or more. The shredded foam may also contain in commercial practice minor amounts of a wide variety of other scrap materials ranging from, for example, string to polyethylene film.

The shredded foam is then transported to a mixing container such as a ribbon blender; and, while the foam particles are being agitated, the prepolymer is added, typically by spraying. Water is typically added to the mixing container before addition of prepolymer, at the same time, or after.

After thorough blending of the shredded foam and prepolymer is achieved, the mixture is transferred to a means for compressing the foam to provide the desired product, thickness and density. In the case of a batch process, the mixture is transferred to a mold; and, in the case of a continuous process, the mixture is fed into continuously moving compression conveyors. In the case of a continuous process, the mixture may first be transferred to a second ribbon blender to insure that adequate blending is obtained.

The shredded foam/prepolymer blend is held in the compressed state, as is well known in the rebonding art, until dimensional stability is achieved, i.e. — there is little or no tendency for the compressed product to expand. More particularly, and as is known in this field, the lack of tendency for the compressed product to expand is a relative term. The term dimensional stability refers to the stability provided by curing the rebonded foam as is conventionally carried out in this field, and the slight expansion which may occur is to be contrasted to the significant expansion tendencies when insufficient curing is used. Curing of the blend can be carried out at either room temperature or at elevated temperatures by injecting hot fluids such as steam or hot dry air or by subjecting the compression container to a conventional radiant heat source. With room temperature curing, it may be desirable to use minor amounts of a catalyst. Suitable catalysts and amounts have been described in connection with the formation of the prepolymers.

The resulting block can then be further fabricated as desired.

The utilization of the prepolymers of the present invention present no processing problems, achieve faster curing times, require lesser amounts of the prepolymer adhesive and allow shorter demolding times in comparison to the presently used prepolymers.

The resulting rebonded polyurethane product can be characterized as a dimensionally stable block of varying size depending upon the intended application. The block comprises discrete foam particles bonded together by an amount of cured prepolymer sufficient to provide the block with dimensional stability. While larger amounts can be used, it will generally be suitable to use no more than about 4 to 6% of prepolymer, based upon the total weight of the block constituents and including the prepolymer. This is in contrast to the 8 to 12% often used with the prepolymers in present practice.

For a given product density, the rebonded foam products of this invention exhibit tensile strengths, tear strength and compression load deflections comparable to products using conventional prepolymers. An added advantage of the present invention, however, resides in the ability to make useful lower density products from shredded foam of a particular density than can be achieved using conventional prepolymers. As an example, with a foam source of 1.5 lbs./ft.$^3$, rebonded foam products having a density of about 2.6 lbs./ft.$^3$ according to the present invention can be achieved in contrast to foams using conventional prepolymers that generally result in foam densities no lower than 3 lbs./ft.$^3$, typically 3.5.

The prepolymer compositions of the present invention and the use of such compositions in forming rebonded urethane foams may be further illustrated by means of the following examples. It should be understood, however, that these examples are intended to be merely illustrative, but not in limitation of, the scope of this invention.

DEFINITIONS

As used in the Examples appearing hereinafter, the following symbols, terms and abbreviations have the indicated meanings:

"Cookout" denotes the period a reaction mixture is heated after all starting materials have been added.

"Ionol" denotes 2,6-di-tert-butyl-4-methylphenol.

"Max." denotes maximum.

"Stripped" denotes removal of volatile materials by heating at reduced pressure.

"Crude hydroxyl number" denotes the hydroxyl number of the stripped, unrefined polyol, corrected for alkalinity.

"Mixed" (in relation to type of feed) denotes that the alkylene oxides used are mixed prior to introduction into the reaction vessel.

"Sequential" (in relation to type of feed) denotes that the alkylene oxides used are introduced into the reaction vessel in discrete units.

"Psig" denotes pounds per square inch gauge pressure.

"Wt." denotes weight.

"Ion Exchange" (in relation to refining) denotes removal of the catalyst from the crude polyol by employing appropriate ion exchange resins.

"Gm" denotes grams.

"Cks." denotes viscosity in centistokes at 25° C.

"NCO" or "free NCO" denotes the free isocyanate content in weight percent.

"Not homogeneous" denotes a prepolymer containing visible solids.

"Homogeneous" denotes a clear prepolymer solution free of visible solids.

PREPARATION PROCEDURES

The polyols, prepolymer compositions and the laboratory formed rebonded polyurethane foams described in the Examples presented hereinafter were prepared according to the following procedures:

A. Polyols

Because of reactor geometry, when the procedure indicates multiple steps were used, the indicated amount of the crude polyol product from the particular step was used as the starter for the following step.

B. Prepolymer Composition

At room temperature, the procedure involved consisted of weighing the isocyanate constituent into a reaction bottle, weighing the polyol constituent containing 0.03 parts stannous octoate per 100 parts polyol into the reaction bottle with the isocyanate and mixing the isocyanate and polyol by vigorously shaking the reaction bottle at ambient temperature. The reaction blend is then allowed to react without further agitation. After all the ingredients are completely mixed, the reaction mixture is allowed to react until the generation of the prepolymer is complete, as visually evidenced by prepolymer clarity. The following Examples were made by this room temperature technique: 11-12, 15-24, 39, 41 and 43. Examples 13 and 14 were formed using the same procedure except that the reaction mixture was maintained at 60° C. Examples 39, 41 and 43 were agitated during their preparation.

All other prepolymer compositions were formed by the following procedure:

The isocyanate was charged to the agitated reaction flask and heated to 65° C. under an inert atmosphere. The polyol was fed to the isocyanate at a rate to keep the temperature between 65° and 70° C. After all the polyol has been fed, the temperature is increased to a cookout temperature of 80° C. Analyses of the prepolymer free NCO content and viscosity were performed at various intervals, and the reaction was considered complete when the free NCO content and viscosity became stabilized.

Laboratory Rebonded Urethane Foam Preparation

One hundred forty-three grams of shredded, flexible urethane foam are weighed using a Mettler balance (Type K7T, maximum capacity 800 grams); and the weighed foam is then poured into a five-gallon open-top bucket. While stirring the shredded foam in the bucket, 15 cubic centimeters of water are slowly added to the shredded foam. Fifteen grams of prepolymer, aged for at least 24 hours after formation, are placed in a 20 cubic centimeter hypodermic syringe. While vigorously stirring the shredded foam/water mixture by hand, the 15 grams of prepolymer from the syringe are slowly sprayed into the shredded foam/water mixture. The vigorous stirring of the shredded foam/water/prepolymer mixture is continued for 30 seconds after addition of the prepolymer to the foam/water mix. A 10 inch high metal cylinder, having an 8 inch inside diameter perforated with 3/32 inch holes in the lower 2-inches of the cylinder, is placed on a metal plate, approximately ½ inch in thickness, 20 inches long and 20 inches wide, with the perforated cylinder end down. The perforations are in two rows with one row being ½ inch from the bottom of the cylinder and the other row 1½ inches from the bottom of the cylinder, the holes being spaced 1 inch apart both horizontally and vertically. The shredded foam/water/prepolymer blend is then poured into the cylinder. A solid wooden cylinder (7¾ inch diameter by 2 inches high) with three metal nails extending 2 inches from one end of the wooden cylinder is placed on top of the foam/water/prepolymer mixture with the metal nails extending downward into the foam. Four 5-pound lead weights approximately 3 inches in diameter are then placed on top of the wooden cylinder, forcing the wooden cylinder down into the metal cylinder until the nails are solidly in contact with the metal plate under the cylinder. The metal plate with the metal cylinder, wooden cylinder, lead weights, and compressed foam mixture is then placed in a circulating, forced air over which is preheated and preset to maintain a constant temperature of 150° C. The entire assembly is kept in the hot air oven for 15 minutes, or other cure time deemed desirable to determine differences in the prepolymer reaction rates. At the end of the cure time, the block of rebonded urethane foam is removed from the cylinder and subjectively evaluated to determine the relative degree of cure of the prepolymer composition.

STARTING MATERIALS

In the Examples appearing hereinafter, the following designations are used to denote the indicated starting materials:

A. Polyols

"PEG 4000" denotes a commercially available "Carbowax" polyethylene glycol having a number average molecular weight in the range from 3000 to 3700.

"PEG 1000" denotes a commercially available "Carbowax" polyethylene glycol having a number average molecular weight in the range of from about 950 to about 1050.

"PPG 425" denotes a polyoxypropylene glycol having an average hydroxyl number of 265.

B. Isocyanates

"TDI" and "TDI-P" denote a mixture of 80 percent 2,4-tolylene diisocyanate and 20 percent 2,6-tolylene diisocyanate.

"TDR" denotes a commercially available product consisting of a blend of TDI and residue, the product having an average free NCO content of 39.6%.

C. Catalysts

"Polycat 12" denotes a commercially available dicyclohexylmethylamine catalyst.

POLYOL PROPERTIES

A. Hydroxyl Number

The hydroxyl number of a polyol is the number of milligrams of potassium hydroxide required for the complete hydrolysis of the fully acylated derivative prepared from 1 gram of polyol. The hydroxyl number can also be defined by the equation:

$$OH = \frac{56.1 \times 1000 \times f}{m.w.}$$

where: OH is the hydroxyl number of the polyol, f is the functionality, that is, average number of hydroxyl groups per molecule of polyol and m.w. is the molecular weight of the polyol.

C. Oxyethylene Content

Measured by either Nuclear Magnetic Resonance ("NMR") or calculated from the ratios of the alkylene oxides used.

D. Oxypropylene Content

Calculated as the difference from 100% in view of the polyol oxyethylene content.

PREPOLYMER PROPERTIES

Free NCO Content

ASTM D1638.

FILTRATION

In all instances, the filtering of the isocyanate reactant or the resulting prepolymer was carried out by employing a conventional 1-liter, stainless steel pressure filter. A coarse grade commercial filter paper was used, and pressure application was achieved by nitrogen at 90 psig.

EXAMPLES 1 TO 7

Examples 1 through 7 illustrate the preparation, using a mixed oxide feed, of polyoxyalkylene polyols having oxyethylene contents varying from 20 to 100 percent.

The details of the preparation and the analyses of the crude and refined products are set forth in Table I:

TABLE I

Mixed oxide Polyol Preparation

| Example No. | 1 | | | 2 | 3 | 4 | 5 | | | 6 | 7 |
|---|---|---|---|---|---|---|---|---|---|---|---|
| Starter Data | | | | | | | | | | | |
| Starter | Step 1 Propylene Glycol | Step 2 Step 1 | Step 3 Step 2 | Step 1 Propylene Glycol | Step 2 Step 1 | Special Starter (b) | Special Starter (b) | Step 1 Propylene Glycol | Step 1 | Step 2 Step 1 | Step 3 Step 2 | Step 1 Propylene Glycol | Step 2 Step 1 | PEG 1000 |
| Weight, grams | 500 | 800 | 3870 | 500 | 800 | 586 | 586 | 761 | 700 | 1918 | 5302 lbs. | 5450 lbs. | 14,000 |
| Potassium hydroxide, grams | 7 | 6 | — | 7 | 6 | 5 | 5 | 6 | 6 | — | 20 lbs. | 125 lbs. | 5 lbs. (sodium hydroxide) |
| Feed data | | | | | | | | | | | | | |
| Type of feed | Mixed | Mixed | Mixed | Mixed | Mixed | Mixed | Mixed | Mixed | Mixed | Mixed | Mixed | Mixed | Ethylene Oxide |
| Ratio of ethylene oxide to propylene oxide, wt. % | 20/80 | 20/80 | 20/80 | 30/70 | 30/70 | 40/60 | 50/50 | 50/50 | 50/50 | 50/50 | 50/50 | 43/57 | 100/0 |
| Weight o mixed oxide fed, grams | 3415 | 3199 | 808 | 3432 | 3926 | 2666 | 2979 | 3253 | 3372 | 959 | 10,630 | 90,600 | 28,500 |
| Temperature, °C | 118 | 118 | 118 | 118 | 118 | 114 | 115 | 115 | 114 | 114 | 110 | 110 | 155 |
| Pressure, psig. max. | 60 | 60 | 60 | 60 | 60 | 60 | 60 | 50 | 50 | 40 | 70 | 70 | 90 |
| Feed time, hours | 5 | 6 | 1 | 4 | 6.5 | 3 | 3 | 5 | 8 | 45 | — | — | — |
| cookout time, hours | 4 | 3.25 | 4.25 | 4 | 4.5 | 2 | 2 | 1.5 | 0.5 | 2 | (22)c | (104)c | (17)c |
| Crude hydroxyl number | — | 45.06 | (a) | — | — | (a) | (a) | 277 | 52.65 | (a) | — | — | (e) |
| | | | | | | | | | 13 | | | | |
| Refining | — | — | — | — | — | — | — | — | 37.3 | Nil | 38.4 | Ion Exchange | |
| Analysis of Refined Product | | | | | | | | | | | | | |
| Hydroxyl number | — | 37.48 | 37.48 | — | 37.09 | 36.87 | — | — | — | — | — | 33.92 | — |
| Acid number | — | 0.003 | 0.003 | — | 0.003 | 0.003 | 0.024 | — | — | 0.01 | — | — | — |
| Water, percent | — | 0.04 | 0.04 | — | 0.016 | 0.107 | — | — | — | — | — | 0.065 | 0.196 |

(a)Refined by treating with 2 per cent magnesium silicate, stabilized with 500 ppm Ionol, filtered, an stripped.
(b)Special starter made by reacting 76.1 grams of propylene glycol with 533 grams of 40/60 ethylene oxide/propylene oxide.
(c)Total batch time high because of waiting for analyses.
(d)Typical plant batch and analyses.
(e) Refined by neutralization with phosphoric acid and filtration.

EXAMPLES 8 TO 10

Examples 8 to 10 illustrate the preparation of three polyols using sequential feed and having oxyethylene contents within the range used to form the prepolymer compositions of the present invention.

The preparation details and the analyses of the crude and refined polyols are set forth in Table II:

TABLE II

| Sequential Oxide Polyol Preparation | | | |
|---|---|---|---|
| Example No. | 8 | 9 | 10 |
| Starter Data | | | |
| Starter | PPG 425 | Special Starter (b) | Special Starter (d) |
| Weight, grams | 542 | 580 | 633 |
| Potassium hydroxide, grams | 5.5 | 5 | 6 |
| Feed Data | | | |
| Ratio of ethylene oxide/Propylene oxide | 40/60 | 38/62 | 41/59 |
| Propylene oxide, grams | 693 | 610 | 660 |
| Ethylene oxide, grams | 874 | 398 | 926 |
| Propylene oxide, grams | 693 | 610 | 669 |
| Ethylene oxide, grams | 882 | 398 | 926 |
| Propylene oxide, grams | 693 | 610 | 660 |
| Temperature, °C. | 114 | 114 | 114 |
| Pressure, psig | 60 | 60 | 60 |
| Feed time, hours | 4 | 3.5 | 5 |
| cookout time, hours | d 2.75 | 3.25 | 2.75 |
| Crude hydroxyl number | 37.5 | 40.51(c) | 38.70 |
| Refining | (a) | (b) | (c) |
| Analysis of Refined Product | | | |
| Hydroxyl number | 37.0 | 37.01 | 37.8 |
| Acid number | — | 0.005 | — |
| Water, per cent | 0.026 | 0.026 | 0.36 |
| Total alkalinity | — | 0.00007 | — |

(a) Refined by treating with 2 per cent by weight magnesium silicate, stabilized with 500 ppm Ionol, filtered and stripped.
(b) Special starter made by reacting 76.1 grams of propylene glycol with 533 grams of ethylene oxide.
(c) Adjusted hydroxyl number by feeding an additional 248 grams of propylene oxide.
(d) Special starter made by reacting 758 grams of a product formed by reactint 3 moles of propylene oxide with one moleof glycerine in the presence of KOH catalyst with 1246 grams of propylene oxide.

EXAMPLES 11 TO 24

Examples 11 to 24 show the preparation of prepolymer compositions using polyols having oxyethylene contents ranging from 14 to 100 percent and TDR, with the exception of Examples 16 and 17 which used TDI.

The prepolymer compositions prepared were evaluated from the standpoint of appearance and were then (with the exception of Examples 23 and 24) used to form laboratory rebonded urethane foams as has been described herein.

The results are set forth in Table III:

TABLE III

| | | Prepolymer Preparation | | | | | |
|---|---|---|---|---|---|---|---|
| | | Polyol Content | | | | | |
| Ex. No. | Polyol Preparation | Oxyethylene % | Oxypropylene, % | Polyol/Isocyanate Ratio | Prepolymer Free NCO, % | Prepolymer Appearance | Prepolymer Preformance as Rebonded Urethane Foam Adhesive |
| 11 | Ex. 6 | 43 | 57 | 100/42.1 | 10 | Solids free, dark brown in color. | Excellent, laboratory rebonded foam blocks cure in less than 14 minutes in 150° C oven. |
| 12 | Ex. 6 | 43 | 57 | 100/28.5 | 6.5 | Solids free, dark brown in color. | Excellent, laboratory rebonded foam blocks cure in less than 14 minutes in 150 ° C oven. |
| 13 | Ex. 7 | 100 | 0 | 100/43.5 | 10 | solid material at room temperature. Melt temperature about 140-180° F | Good laboratory rebonded foam blocks are almost cured in 15 minutes in 150° C oven. |
| 14 | Ex. 7 | 100 | 0 | 100/29.5 | 6.5 | Solid material at room temperature. Melt temperature about 140-180° F | Good, laboratory rebonded foam blocks are almost cured in 15 minutes in 150° C oven. |
| 15 | Ex. 6 | 43 | 57 | 100/44.2 | 10 | solids free-dark brown color. | Excellent, laboratory rebonded foam blocks cure in less than 15 minutes in 150° C oven. |
| 16 | Ex. 5 | 43 | 57 | 100/34.2 (TDI) | 10 | solids free, water clear. | Good, laboratory rebonded foam blocks are almost cured after 15 minutes in 150° C oven. |
| 17 | (a) | 14 | 86 | 100/35.7 (TDI) | 10 | Solids free-water clear | Poor laboratory rebonded foam blocks did not cure after 15 minutes in 150° C oven |
| 18 | (a) | 14 | 86 | 100/45.1 | 10 | Polyol/isocyanate mix did not become clear and solids free. | Poor, laboratory rebonded foam blocks did not cure after 15 minutes in 150° C oven. |
| 19 | 10 | 40 | 60 | 100/46.6 | 10 | Solids free, dark brown color. | Very good, laboratory rebonded foam blocks are almost cured after 14 minutes in 150° C oven. |
| 20 | 10 | 40 | 60 | 100/32.4 | 6.5 | solids free, dark brown color. | Very good, laboratory rebonded foam blocks are almost cured after 14 minutes in 150° C oven. |
| 21 | 4 | 50 | 50 | 100/30 | 6.5 | Solids free, dark brown color. | Very good, laboratory rebonded foam blocks are almost cured after 14 minutes in 150° C |
| 22 | 2 | 30 | 70 | 100/22.5 | 6.5 | Solids free, dark Brown color. | Good, laboratory rebonded foam Blocks are almost cured after 15 minutes in 150° oven. |
| 23 | 1 | 20 | 80 | 100/27.6 | 6.5 | Polyol/isocynate blend did not become clear and solids free. | Not tested |
| 24 | 1 | 20 | 80 | 100/41.7 | 10 | Polyol.isocyanate blend did not become clear and solids | Not tested |

TABLE III-continued

| | | Prepolymer Preparation | | | Polyol Content | | |
|---|---|---|---|---|---|---|---|
| Ex. No. | Polyol Preparation | Oxyethylene % | Oxypropylene, % | Polyol/Isocyanate Ratio | Prepolymer Free NCO, % | Prepolymer Appearance | Prepolymer Preformance as Rebonded Urethane Foam Adhesive |
| | | | | | | free. | |

(a)Sequential feed, KOH catalyzed polyol formed using a glycerine starter having an oxyethylene content of 14 percent.

As can be seen, by maintaining the oxyethylene content of the polyol within the range of from 30 to 100 percent, the laboratory rebonded foam blocks formed from the prepolymers using such polyols can be satisfactorily cured in 15 minutes.

EXAMPLES 25 TO 29

These Examples illustrate the effect on the homogeneity of the prepolymer composition due to varying the oxyethylene content in the polyol constituent.

The various prepolymer compositions were maintained at a cookout temperature of about 80° C., and analyses of the free NCO content, viscosity and visual appearance of the prepolymers were made after cookout times of 1, 3 and 5 hours as well as after varying days of storage at room temperature.

The results are set forth in Table IV:

(Ex. 25), the prepolymers formed from polyols having oxyethylene contents in the range of 30 to 50% exhibit homogeneity upon formation and have stability which allows storage at room temperature for a number of days without losing the homogeneous characteristic.

EXAMPLES 30 to 33

Examples 30 to 33 illustrate the effect of varying the amount of free NCO content of prepolymers formed from TDR and a polyoxyalkylene glycol having an oxyethylene content of 43 percent and which is described in Ex. 6.

The free NCO content was varied from 3 to 10 percent, and a cookout temperature of 80° C. was used. After periods of 1, 3 and 5 hours as well as after storage for a number of days at room temperature, analyses of the NCO content and the viscosity were measured.

TABLE IV

| | Effect of Oxyethylene Content on Homogenity of Prepolymer | | | | |
|---|---|---|---|---|---|
| Example No. | 25 | 26 | 27 | 28 | 29 |
| Example No. | 25 | 26 | 27 | 28 | 29 |
| Charge, gm of TDR | 612 | 612 | 712 | 612 | 250 |
| Temperature, ° C | 65 | 65 | 65 | 65 | 65 |
| Polyol, gm | 1388 | 1388 | 1388 | 1388 | 1750 |
| Preparation Ex. No. | 1 | 2 | 3 | 4 | (a) |
| Temperature during polyol feed, ° C | 65 | 65 | 65 | 65 | 65 |
| Appearance after polyol feed is in | not homogeneous | homogeneous | homogeneous | homogeneous | not homogeneous |
| Cookout Temperature, ° C | 80 | 80 | 80 | 80 | 80 |
| Cookout time, hours | 1 | 1 | 1 | 1 | 1 |
| Analyses | | | | | |
| NCO, % by wt. | — | 10.5 | 12.0 | 10.5 | — |
| Viscosity, cks. at 25° C | — | 1350 | 1286 | 1456 | — |
| Appearance | not homogeneous | homogeneous | homogeneous | homogeneous | not homogeneous |
| Cookout time, hours | 3 | 3 | 3 | 3 | 3 |
| Analyses | | | | | |
| NCO, % by wt. | — | 10.2 | 11.7 | 10.2 | — |
| Viscosity, cks. at 25° C | — | 1917 | 1662 | 1978 | — |
| Appearance | not homogeneous | homogeneous | homogeneous | homogeneous | not homogeneous |
| Cookout time, hours | 5 | 5 | 5 | 5 | 5 |
| Analyses | | | | | |
| NCO, % by wt. | — | 10.1 | — | — | — |
| Viscosity, cks. at 25° C | — | 1957 | — | — | — |
| Appearance | not homogeneous | homogeneous | homogeneous | homogeneous | not homogeneous |
| Cool to room temperature | | | | | |
| Analyses after storage at room temperature, days | 10 | 10 | 8 | 8 | 19 |
| Analyses | | | | | |
| NCO, % by wt. | 10.1 | 10.1 | 11.7 | 10.3 | 2.0 |
| Viscosity, cks. at 25° C | 2161 | 2069 | 1767 | 2109 | ~80,000 |
| Appearance | not homogoeneous | not homogeneous | homogeneous | homogeneous | not homogeneous |

(a)Sequential feed, KOH catalyzed polyol formed using a glycerine starter having an oxyethylene content of 14%.

In contrast to the prepolymers formed from polyols having oxyethylene contents of 14% (Ex. 29) and 20%

The results are set forth in Table V:

TABLE V

| | Effect of Varying Free NCO Content on Prepolymer Stability | | | |
|---|---|---|---|---|
| Example No. | 30 | 31 | 32 | 33 |
| Approximate NCO, % by wt. | 3 | 6 | 7 | 10 |
| Charge, gm | | | | |
| TDR | 282 | 428 | 490 | 621 |
| Temperature, ° C | 65 | 65 | 65 | 65 |
| Polyol, gm | 1718 | 1572 | 1510 | 1379 |
| Temperature, ° C during polyol feed | 65–70 | 65–70 | 65–70 | 65–70 |
| Cookout temperature, ° C | 80 | 80 | 80 | 80 |
| Cookout time, hours | 1 | 1 | 1 | 1 |
| Analyses | | | | |
| NCO, % by wt. | 4.0 | 7.5 | 7.7 | 10.5 |
| Viscosity, cks. at 25° C | 1616 | 842 | 2022 | 1540 |
| Cookout time, hours | 3 | 3 | 3 | 3 |

TABLE V-continued

Effect of Varying Free NCO Content on Prepolymer Stability

| Example No. | 30 | 31 | 32 | 33 |
|---|---|---|---|---|
| Analyses | | | | |
| NCO, % by wt. | 3.6 | 6.3 | 7.4 | 10.2 |
| Viscosity, cks. at 25° C | 2718 | 3128 | 2725 | 2012 |
| Cookout time, hours | 5 | 5 | 5 | 5 |
| Analyses | | | | |
| NCO, % by wt. | 3.3 | 6.2 | 7.3 | 10.3 |
| Viscosity, cks. at 25° C | 4046 | 3366 | 2900 | 2030 |
| Cool to room temperature | | | | |
| Analyses after storage at room temp., days | 19 | 21 | 34 | 21 |
| NCO, % by wt. | 3.0 | 6.1 | 7.3 | 10.1 |
| Viscosity, cks. at 25° C | 7336 | 3769 | 3288 | 2302 |
| Appearance | homogeneous | homogeneous | homogeneous | homogeneous |

As can be seen, the viscosity of the prepolymer decreases in a linear fashion with increasing free NCO content. However, upon storage, the prepolymer having 3% free NCO content are less stable.

EXAMPLES 34 TO 37

These Examples compare the properties of prepolymers made from both TDI-P and TDR and with a conventional polyoxypropylene triol containing 14 percent ethylene oxide and having a hydroxyl number of 46 to prepolymers made with the polyol of Example 6 (oxyethylene content of about 43 percent).

A cookout temperature of 80° C. was maintained in all instances, and analyses of various samples at certain times of cookout were made for the NCO content, the viscosity and the appearance of the prepolymer.

The results are set forth in Table IV:

TABLE VI

Effect of Imocyanate and Polyl Composition Upon Prepolymer Stability

| Example No. | 34 | 35 | 36 | 37 |
|---|---|---|---|---|
| Isocyanate | TDR | TDR | TDI-P | TDI-P |
| Charge, gm | 621 | 250 | 532 | 515 |
| Temperature, ° C | 65 | 65 | 65 | 65 |
| Polyol, gm | 1379 | 1750 | 1468 | 1485 |
| Preparation Ex. No. | 6 | (a) | (a) | 6 |
| Temperature during polyol feed, ° C | 65-70 | 65-70 | 65-70 | 65-70 |
| Appearance after polyol feed is in | homogeneous | not homogeneous | homogeneous | homogeneous |
| Cookout temperature, ° C | 80 | 80 | 80 | 80 |
| Cookout time, hours | 1.5 | 1 | 1 | 1 |
| Analyses | | | | |
| NCO, % by wt. 10.4 | — | 10.5 | 10.4 | |
| Viscosity, cks. at 25° C | 1818 | — | 1094 | 815 |
| Appearance | homogeneous | non homogeneous | homogeneous | homogeneous |
| Cookout time, hrs | 3.5 | 3 | 2.5 | 2.5 |
| Analyses | | | | |
| NCO, % by wt. | 10.1 | — | 10.1 | 10.3 |
| Viscosity, cks. at 25° C | 2106 | — | 1579 | 1010 |
| Appearance | homogeneous | not homogeneous | homogeneous | homogeneous |
| Cookout time, hours | 5 | 5 | 5 | 4 |
| Analyses | | | | |
| NCO, % by wt. | — | — | 10.0 | 10.0 |
| Viscosity, cks. at 25° C | — | — | 1657 | 1068 |
| Appearance | homogeneous | not homogeneous | homogeneous | homogeneous |

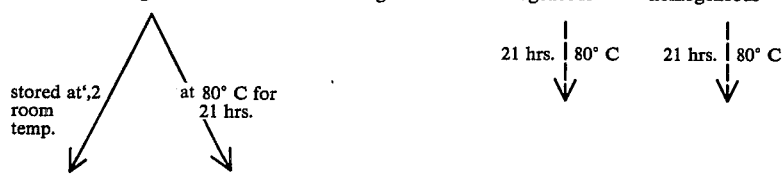

| | stored at, 2 room temp. | at 80° C for 21 hrs. | 21 hrs. ↓ 80° C | 21 hrs. ↓ 80° C |
|---|---|---|---|---|
| Analysis | | | | |
| NCO, T by wt. | 10.15 | 10.15 | 9.8 | 9.7 |
| Viscosity, cks. at 25° C | 2139 | 2198 | 1780 | 1132 |
| Appearance | homogeneous | homogeneous | homogeneous | homogeneos |
| Analyses after storage | | | | |
| at room temp., days | 20 | 20 | 19 | 16 | 16 |
| NCO, T by wt. | 10.6 | 10.1 | 2.0 | 9.9 | 9.8 |
| Viscosity, cks. at 25° C | 2344 | 2406 | ~80,000 | 1824 | 1142 |
| Appearance | homgeneous | homogeneous | not homogeneous | homogeneous | homogeneous |
| Preopolymer, gm | | | | 1000 | 1000 |
| Dibutyltindilaurate catalyst, gm | | | | 0.459 | 0.435 |
| Hours prepolymer stored at room temperature before catalyst added | | | | 24 | 24 |
| Temperature, ° C | | | | 80 | 80 |
| Cookout time, hours | | | | 1 | 1 |
| Analysis | | | | | |
| NCO, T by wt. | | | | — | — |
| Viscosity, cks. at 25° C | | | | 1845 | 1149 |
| Cookout time, hours | | | | 2 | 2 |
| Analysis | | | | | |
| NCO, % by wt. | | | | — | — |
| Viscosity, cks. at 25° C | | | | 1907 | 1160 |
| Cookout ttime, hours | | | | 22 | 22 |
| Analyses | | | | | |
| NCO, % by wt. | | | | 9.5 | 9.5 |
| Viscosity, cks. at 25° C | | | | 2227 | 1242 |
| Analyses after storage at room | | | | | |

TABLE VI-continued

| Effect of Imocyanate and Polyl Composition Upon Prepolymer Stability | | |
| --- | --- | --- |
| temp., days | 13 | 13 |
| Analyses after storage at room | | |
| NCO, % by wt. | 9.3 | 9.6 |
| Viscosity, cks. at 25° C | 2490 | 1289 |
| Appearance | some solids | homogeneous |

(1) Sequential feed, KOH catalyzed polyol formed using a glycerol starter having an oxyethylene content of 14%.

The prepolymers of Examples 34 and 37 exhibit superior stability in contrast to the prepolymers of Examples 35 and 36, which were made with a polyol having a low oxyethylene content.

EXAMPLES 38 TO 43

Examples 38 to 43 illustrate the effect of reaction temperature and polyol water content on the reaction rate of prepolymers formed from TDR and the polyol constituent prepared in Example 6. The water content of the polyol of Example 6 was increased for Examples 40 and 41 by water addition. The water content for Examples 42 and 43 was decreased by stripping.

A cookout temperature of 80° C. was compared with a temperature of 25°-30° C., and analyses were periodically made of the viscosity and the free NCO content. After storage at room temperature for a number of days, the prepolymers were also evaluated visually for appearance. The results are set forth in Table VII:

reaction requires a minimum water content to provide a homogeneous prepolymer.

EXAMPLES 44 to 46

Prepolymer compositions according to the present invention were compared to a conventionally used prepolymer composition in the formation of low density rebonded foam by batch techniques.

The prepolymer compositions evaluated are set forth in Table VIII below:

TABLE VIII

| | Prepolymer Compositions - Batch Trial | | |
| --- | --- | --- | --- |
| Example No. | 44 | 45 | 46 |
| Polyol, oxyethylene content, % | 14(b) | 43(a) | 43(a) |
| Isocyanate | TDI | TDI | TDR |
| NCO content, % | 10.0 | 6.5 | 10.0 |

(a)The polyol of Example 6.
(b)Sequential feed, KOH catalysed polyol formed using a glycerol starter.

TABLE VII

| Effect of Reaction Temperature and Water Content on Prepolymer Reaction Rate | | | | | | |
| --- | --- | --- | --- | --- | --- | --- |
| Example No. | 38 | 39 | 40 | 41 | 42 | 43 |
| Charge, gm | | | | | | |
| TDR | 490 | 490 | 510 | 510 | 490 | 490 |
| Temperature, ° C | 65 | 25 | 65 | 22 | 65 | 24 |
| Polyol, gm | 1510 | 1510 | 1510 | 1510 | 1510 | 1510 |
| water, % in polyol | 0.07 | 0.07 | 0.19 | 0.19 | 0.01 | 0.01 |
| Temperature during polyol feed, ° C | 65–70 | 25 | 65 | 22 | 65 | 24 |
| Cookout temerature, ° C | 80 | 25–30 | 80 | 25–30 | 80 | 25–30 |
| Cookout time, hours | 1 | 1 | 1 | 1 | 1 | 1 |
| Analyses | | | | | | |
| NCO, % by wt. | 7.7 | 8.9 | 7.7 | 8.8 | 8.0 | 9.4 |
| Viscosity, cks. at 25° C | 2022 | 743 | 2501 | 842 | 1632 | 494 |
| Cookout time, hours | 2 | 2 | 2 | 2 | 2 | — |
| Analyses | | | | | | |
| NCO, % by wt. | 7.5 | 8.7 | 7.5 | 8.5 | 7.7 | — |
| Viscosity, cks. at 25° C | 2437 | 770 | 3251 | 1052 | 2222 | — |
| Cookout time, hours | 3 | 3 | 3 | 3 | 3 | 3 |
| Analyses | | | | | | |
| NCO, % by wt. | 7.4 | 8.5 | 7.4 | 8.3 | 7.8 | 9.1 |
| Viscosity, cks. at 25° C | 2725 | 923 | 3351 | 1205 | 2498 | 618 |
| Cookout time, hours | 4 | 4 | 4 | 4 | 4 | 4 |
| Analyses | | | | | | |
| NCO, % by wt. | 7.3 | 8.4 | 7.3 | 8.1 | 7.7 | 9.1 |
| Viscosity, cks. at 25° C | 2870 | 995 | 3651 | 1337 | 2555 | 692 |
| Cookout time, hours | 6 | 6 | 5 | 5 | 5 | 5 |
| Analyses | | | | | | |
| NCO, % by wt. | 7.4 | 8.2 | 7.3 | 8.0 | 7.6 | 8.9 |
| Viscosity, cks at 25° C | 2959 | 1144 | 3700 | 1448 | 2594 | 730 |
| Cool to room temperature | | | | | | |
| Analyses after days | 1 | 1 | 1 | 1 | — | — |
| NCO, % by wt | 7.4 | 7.7 | 7.3 | 7.4 | — | — |
| Viscosity, cks at 25° C | 3023 | 1880 | 3841 | 2642 | — | — |
| Analyses after storage at Room temperature, days | 34 | 34 | 29 | 29 | 26 | 26 |
| NCO, % by wt. | 7.3 | 7.1 | 7.3 | 7.0 | 7.5 | 7.4 |
| Viscosity, cks. at 25° C | 3288 | 3475 | 4203 | 5086 | 2849 | 2998 |
| Appearane | homogeneous | homogeneous | homogeneous | homogeneous | homogeneous | not homogeneous |

Prepolymer reaction rates are much faster at elevated temperatures, as evidenced by the free NCO content and viscosity characteristics. Increased water contents result in increased viscosity in the resultant prepolymer. As can be seen from a comparison of the prepolymer of Example 43 (low water content) with the prepolmers of Examples 39 and 41, a room temperature, uncatalyzed In the control run, Example 44, 33 pounds of prepolymer per pound of Polycat 12 catalyst was used. The buns could be demolded after one hour, and the cure of these buns at that time was evaluated as being only fair. In contrast, buns using the prepolymer of Example 45 (diluted with methylene chloride to reduce the viscosity to permit adequate spraying) containing 33 pounds of the diluted prepolymer blend could be successfully demolded in 45 minutes, with or without the addition of the catalyst. The lowest concentration of the prepolymer/methylene chloride blend evaluated was 27 pounds of prepolymer blend per 350 pound bun of bonded foam; and, at this rate, demolding in 45 minutes was achieved without the use of the catalyst.

In Example 46, the prepolymer/methylene chloride blend used to form buns at a rate of 33 pounds of the blend and one pound of catalyst allowed demolding after only 30 minutes of cure. The completeness of cure at the time of demolding was evaluated as being very good. Using the prepolymer composition of Example 46, the concentration of the prepolymer was gradually decreased and the foam bun cure evaluated after each prepolymer concentration change. The lowest prepolymer concentration evaluated was 17 pounds of the prepolymer/methylene chloride blend with no catalyst being added. These buns could be demolded after 40 minutes of cure; and the foam strength was evaluated as being very good.

EXAMPLES 47 to 48

These examples illustrate an evaluation on a continuous rebonded foam machine and compare a typically used prepolymer composition with a prepolymer composition in accordance with the present invention. The prepolymer composition utilized in Example 47 is identified in Example 46, and this is compared to a control (Example 48) utilizing a prepolymer (10 percent free NCO) prepared from TDI and a polyoxypropylene triol having a hydroxyl number of about 56. The results are set forth in Table IX below:

TABLE IX

| Example No. | 47 | 48 |
|---|---|---|
| % Solids in prepolymer composition | 77 | 100 |
| % Methylene chloride in prepolymer composition | 23 | 0 |
| Pounds of shredded foam/minute | 77 | 77 |
| Prepolymer blend in rebonded foam at start, % | 6.9 | 8.6 |
| Prepolymer blend in rebonded foam at end, % | 5.1 | 8.6 |
| Prepolymer solids in rebonded foam at start, % | 5.3 | 8.6 |
| Prpolymer solids in rebonded foam at end, % | 3.9 | 8.6 |
| Rebonded foam cure time, minutes | 3 | 3 |

It should be appreciated that there may be inaccuracies in the data collected due to problems encountered during the trial. Specifically, a prepolymer mix tank was inoperable, and an air operated pump was used to transfer the prepolymer blend through the spray nozzles and into the blender. Due to the higher viscosity of the prepolymer used in Example 47, high concentrations of methylene chloride had to be employed to reduce the viscosity to a level which could be handled.

The data generated do indicate that the prepolymer of Example 47 can be employed at a much lower concentration than the control prepolymer of Example 48. The use levels shown would indicate that the prepolymer of Example 47 could allow a 41 percent decrease in the prepolymer blend use level and a 55 percent decrease in the prepolymer solids use level.

EXAMPLES 49 to 50

These Examples present an evaluation similar to Examples 47 to 48, except that the prepolymer composition of Example 50 employs the prepolymer identified in Example 45 (i.e. - having a free NCO content of 6.5 percent).

The data generated are set forth in Table X below:

TABLE X

| Example No. | 49 | 50 |
|---|---|---|
| % Solids in prepolymer compositin | 100 | 71 |
| % Methylene chloride in prepolymer composition | 0 | 29 |
| Pounds of shredded foam minute at start | 36 | 36 |
| Pounds of prepolymer blend minute at start | 2.47 | 2.28 |
| Prepolymer blend in rebonded foam at start, % | 6.4 | 6.0 |
| Prepolymer solids in rebonded foam at start, % | 6.4 | 4.3 |
| Rebonded foam cure time, minutes (at start) | 2.5 | 2.5 |
| Pounds of shredded foam/minute at end | — | 45 |
| Rebonded foam cure time, minutes (at end) | 2.5 | 2.5. |
| Prepolymer blend in rebonded foam at end, % | — | 4.8 |
| Prepolymer solids in rebonded foam at end, % | — | 3.4 |
| Rebonded foam cure time, minutes (at end) | — | 2 |

After the completion of the Example 50 run, set forth in Table X, the prepolymer of Example 49 was again sprayed into the shredded foam/prepolymer blender, the prepolymer concentration increased to the 6.4 percent level successfully used earlier in Example 49 while the rebonded foam cure time was maintained at 2 minutes. The rebonded foam produced under these circumstances was inadequately cured and began to fall apart (i.e. - was dimensionally unstable) upon leaving the compression area of the machine.

During the trial, rebonded foam production using a cure time of about 1.7 minutes was attempted using the prepolymer composition of Example 50. The foam did not bond satisfactorily at this cure time, and the cure time was thereafter increased to 2 minutes for the remainder of the trial.

From the data, the prepolymer composition of Example 50 performed at 25% lower prepolymer blend concentration than did the control prepolymer of Example 49. On a prepolymer solids basis, the concentration of the prepolymer of Example 50 was 47 percent lower than the concentration of the control prepolymer used in Example 49.

EXAMPLES 51 TO 55

These Examples demonstrate the preparation of homogeneous prepolymer solutions according to the present invention using isocyanates ranging from evaporator tails to toluene diisocyanate to blends thereof and further illustrates the necessity of maintaining the oxyethylene content of the polyol within the levels previously described.

The results are set forth in Table XI:

TABLE XI

| Example No. | 51 | 52 | 53 | 54 | 55 |
|---|---|---|---|---|---|
| Charoo, gm | 621 | 633 | 532 | 515 | 364 |
| Isocyanate | TDR | TDR | TDI-P | TDI-P | Evap. Tails |
| Temperature, °C | 65 | 65 | 65 | 65 | 65 |
| Polyol, oxyethylene content, % | 50(a) | 14(b) | 14 | 50 | 50 |

TABLE XI-continued

| | | | | | |
|---|---|---|---|---|---|
| Temperature during polyol feed, °C. | 65–70 | 65–70 | 65–70 | 65–70 | 65–70 |
| Appearance after polyol feed is in | homogeneous | not homogeneous | homogeneous | homogeneous | homogeneoys |
| Cookout temperature, °C. | 80 | 80 | 80 | 80 | 80 |
| Cookout time, hours | 1.5 | 1 | 1 | 1 | 1 |
| Analyses | | | | | |
| NCO, % by wt | 10.4 | 10.3 | 10.5 | 10.4 | 9.9 |
| Viscosity, cks at 25° C. | 1818 | 2850 | 1094 | 815 | 6094 |
| Appearance | homogeneous | not homogeneous | homogeneous | homogeneous | homogeneous |
| Cookout time, hours | 3.5 | 3 | 2.5 | 2.5 | 2 |
| Analyses | | | | | |
| NCO, % by wt | 10.1 | 10.0 | 10.1 | 10.3 | 10.0 |
| Viscosity, cks at 25° C. | 2106 | 3880 | 1579 | 1010 | 6830 |
| Appearance | homogeneous | not homogeneous | homogeneous | homogeneous | homogeneous |
| Cookout time, hours | 5 | 5 | 5 | 4 | 5 |
| Analyses | | | | | |
| NCO, % by wt | — | 10.2 | 10.0 | 10.0 | 9.9 |
| Viscosity, cks at 25° C. | — | 3962 | 1657 | 1068 | 7507 |
| Appearance | | homogeneous | not homogeneous | homogeneous | homogeneous | homogeneous |
| | stored at room temperature 1 day | at 80° C. for 21 hours | | 80° C. 21 hours | 80° C. 21 hours |
| Analyses | | | | | |
| NCO, % by wt | 10.15 | 10.15 | | 9.8 | 9.7 |
| Voscosity, cks at 25° C | 2139 | 2198 | | 1780 | 1132 |
| Appearance | homogeneous | homogeneous | | homogeneous | homogeneous |
| Analyses, day at room temp. | 20 | 20 | 14 | 16 | 16 | 11 |
| NCO, % by wt | 10.6 | 10.1 | 10.0 | 9.9 | 9.8 | 9.78 |
| Viscosity, cks at 25° C. | 2344 | 2406 | 4338 | 1824 | 1142 | 8500 |
| Appearance | homogeneous | homogeneous | not homogeneous | homogeneous | homogeneous | homogeneous |
| Analyses, days at room temp. | 35 | 35 | — | 53 | 53 | — |
| NCO, % by wt | 9.9 | 9.9 | — | 9.9 | 9.8 | — |
| Viscosity, cks at 25° C. | 2489 | 2574 | — | 1816 | 1157 | — |
| Appearance | homogeneous | homogeneous | — | homogeneous | homogeneous | — |
| Prepolymer, cm | | | | 1000 | 1000 | |
| Polycat 12 catalyst, cm | | | | 0.459 | 0.435 | |
| Hours prepolymer stored at room temperature before catalyst added | | | | 24 | 24 | |
| Temperature, °C. | | | | 80 | 80 | |
| Cookout time, hours | | | | 1 | 1 | |
| Analyses | | | | | | |
| NCO, % by wt | | | | | | |
| Viscosity, cks at 25° C. | | | | 1846 | 1149 | |
| Cookout time, hours | | | | 2 | 2 | |
| Analyses | | | | | | |
| NCO, % by wt | | | | — | — | |
| Viscosity, cks at 25° C. | | | | 1907 | 1160 | |
| Cookout time, hours | | | | 22 | 22 | |
| Analyses | | | | | | |
| NCO, % by wt | | | | 9.5 | 9.5 | |
| Viscosity, cks at 25° C. | | | | 2277 | 1242 | |
| Stored at room temperature, days | | | | 13 | 13 | |
| Analyses | | | | | | |
| NCO, % by wt | | | | 9.3 | 9.6 | |
| Viscosity, cks at 25° C. | | | | 2490 | 1289 | |
| Appearance | | | | siome solids | homogeneous | |
| Stored at room temperature, days | | | | 51 | 51 | |
| Analyses | | | | | | |
| NCO, % by wt | | | | 9.1 | 9.5 | |
| Viscosity, cks at 25° C. | | | | 2718 | 1322 | |
| Appearance | | | | some solids | homogeneous | |

(a)An ethylene oxide/propylene oxide adduct of propylene glycol having a CH No. of 38.
(b)Sequential feed, KOH catalyzed polyol formed using a glycerine starter.

As can be seen, homogeneous prepolymers can be prepared from evaporator tails, tolylene diisocyanate and blends thereof when the polyol employed has an exyethylene content of 50%.

EXAMPLES 56 TO 60

These Examples illustrate the preparation of prepolymers employing MDI and polymeric MDI with the polyol described in Example 51 and show the effects on the character of the prepolymer when a pre- or post-filtration is utilized.

The results are set forth in Table XII:

TABLE XII

| Example No. | 56 | 57 | 58 | 59 | 60 |
|---|---|---|---|---|---|
| Isocyanate | Polymeric MDI | Polymeric MDI | Polymeric MDI | MDI | MDI |
| gm. | 385 | 385 | 385 | 361 | 361 |
| filtered | No | No | Yes | No | No |
| Polyol, gm. | 615 | 615 | 615 | 639 | 639 |
| Temperature during polyol feed, °C. | 65 | 65 | 65 | 65 | 65 |
| Appearance after polyol feed is in | hazy, black | hazy, black | clear, black | milky | milky |
| Cookout temperature, °C. | 80 | 80 | 80 | 80 | 80 |
| Cookout time, hours | 3 | 3 | 3 | 3 | 3 |
| Analyses of prepolymer | | | | | |
| NCO, % by wt. | 9.5 | 9.5 | 9.9 | 10.1 | 10.1 |

TABLE XII-continued

| Example No. | 56 | 57 | 58 | 59 | 60 |
|---|---|---|---|---|---|
| Viscosity, cks at 25° C. | 12,500 | 12,500 | 12,600 | 1,730 | 1,730 |
| Appearance | hazy, black | hazy, black | clear, black | white slush | white slush |
| Prepolymer filtered | No | Yes | No | No | Yes |
| Analyses of filtered prepolymer | | | | | |
| NCO, % by wt. | — | 9.4 | — | — | 10.2 |
| Viscosity, cks at 25° C. | — | 12,400 | — | — | 1,760 |
| Appearance | — | clear, black | — | — | white |
| Room temperature storage time, days | 17 | 17 | 12 | 17 | 17 |
| Appearance | hazy, black sediment | clear, black | hazy, black sediment | white slush | white slush |
| Prepolymer, gm | 80 | 80 | 80 | 80 | 80 |
| Methylene chloride, gm | 20 | 20 | 20 | 20 | 20 |
| Appearance of diluted prepolymer | hazy, black sediment | clear, black | hazy, black sediment | white, opaque | white, opaque |

As can be seen a homogeneous prepolymer solution with polymeric MDI having storage stability us prepared when post-filtration is utilized. However, when MDI is employed, while stable, the prepolymer is not homogeneous.

EXAMPLES 61 TO 70

These Examples further illustrate the preparation of prepolymers using as the isocyanate constituent TDR, polymeric MDI, MDI and various blends.

The results are set forth in Table XIII:

homogeneous prepolymers when polymeric MDI is used.

EXAMPLES 71 TO 77

These Examples illustrate the preparation of laboratory rebonded urethane foams utilizing MDI and polymeric MDI prepolymers. A TDR prepolymer was also employed to provide a comparison. The polyol used in each Example was that identified in Example 51.

The procedure was the same as previously described, except that 120 gms. of shredded foam and 12 cubic

TABLE XIII

| Example No. | 61 | 62 | 63 | 64 | 65 | 66 | 67 | 68 | 69 | 70 |
|---|---|---|---|---|---|---|---|---|---|---|
| Isocyanate | MOI | MOI | Polermeric MOI | Polymeric MOI | TDR | TDR | TDI-P, Polymeric MOI (1) | TDI-P, Polymeric MOI | Polymeric MOI, MOI (1) | Polymeric MOI, MOI (1) |
| gm | 361 | 372 | 385 | 398 | 621 | 633 | 309 | 318 | 373 | 383 |
| Temperature, ° C. | 65 | 65 | 65 | 65 | 65 | 65 | 65 | 65 | 65 | 65 |
| Polyol, gm.(2) | 639 | 628 | 615 | 606 | 1379 | 1367 | 691 | 683 | 627 | 617 |
| Temperature during polyol feed, ° C. | 65 | 65 | 65 | 65 | 65 | 65 | 65 | 65 | 65 | 65 |
| Appearance after polyol feed is in | sl. haze | hazy | sl. haze | hazy | clear black | hazy | sl. haze | hazy | sl. haze | hazy |
| Cookout temperature, ° C. | 80 | 80 | 80 | 80 | 80 | 80 | 80 | 80 | 80 | 80 |
| Cookout time, hours | 1 | 1 | 1 | 1 | 1 | 1 | 1 | 1 | 1 | 1 |
| Analyses | | | | | | | | | | |
| NOO, % by wt. | 10.7 | 10.1 | 9.4 | 10.2 | 10.1 | 10.3 | 9.8 | 10.4 | 9.8 | 10.3 |
| Viscosity, cks at 25° C. | 1620 | 1449 | 10,830 | 16,050 | 2245 | 2850 | 1962 | 2647 | 3734 | 6045 |
| Appearance | sl. haze | hazy | sl. hazy | hazy | clear black | hazy | sl. haze | hazy | sl. haze | hazy |
| Cookout time, hours | 3 | 3 | 3 | 3 | 3 | 3 | 3 | 3 | 3 | 3 |
| Analyses | | | | | | | | | | |
| NOO, % by wt | 9.7 | 9.8 | 10.0 | 9.3 | 10.1 | 10.0 | 9.7 | 10.1 | 9.6 | 10.1 |
| Viscosity, cks at 25° C. | 2294 | 2997 | 17,680 | 33,450 | 2434 | 3880 | 2767 | 3917 | 5588 | 8875 |
| Appearance | sl. haze | hazy | sl. haze | hazy | clear black | hazy | sl. haze | hazy | sl. haze | hazy |
| Cookout time, hours | 5 | 5 | 5 | 5 | 5 | 5 | 5 | 5 | 5 | 5 |
| Analyses | | | | | | | | | | |
| NOO, % by wt. | 9.7 | 10.1 | 9.7 | 9.9 | 10.0 | 10.2 | 9.5 | 10.1 | 9.8 | 9.8 |
| Viscosity, cks at 25° C. | 2473 | 3230 | 18,240 | 35,500 | 2489 | 3960 | 2879 | 3983 | 5876 | 9169 |
| Appearance | sl. haze | hazy | sl. haze | hazy | clear black | hazy | sl. haze | hazy | sl. haze | hazy |
| Cool to room temperature Stored at room temperature, days | 16 | 16 | 15 | 25 | 25 | 14 | 18 | 18 | 17 | 17 |
| NOO, % by wt. | 9.7 | 10.1 | 9.3 | 10.0 | 9.9 | 10.0 | 9.5 | 10.1 | 9.5 | 10.0 |
| Viscosity, cks at 25° C. | 2161 | 3245 | 10.2% | 34.31% | 2135 | 4778 | 2649 | 3958 | 3932 | 9209 |
| Appearance | white slush | white slush | sediment | sediment | clear black | sediment | resiliment | resiliment | sediment | sediment |

(1) The weight ratio of the oil mixtures

As can be seen, a homogeneous prepolymer was only formed when TDR was used with the polyol being one containing about 50% oxyethylene content. However, as set forth in Examples 56 to 60, filtration can provide centimeters of water and of the prepolymer were utilized.

The results are set forth in Table XIV:

TABLE XIV

| Example No. | 71 | 72 | 73 | 74 | 75 |
|---|---|---|---|---|---|
| Prepolymer (1) | MDI (Prepared in Ex. 59) | MDI (prepared in Ex. 60; post-filtered) | Polymeric MDI (prepared in Ex. 57; post-filtered) | Polymeric MDI (prepared in Ex. 58; pre-filtered) | TDR (2) |
| Physical Properties of Rebonded form | | | | | |
| Density, lbs./ft.³ | 5.17 | 5.398 | 5.33 | 4.992 | 5.436 |
| Tensile strength, psi. | 7.15 7.12 | 2.84 | 2.32 | 7.96 | |
| Elongation, % | 72 | 66 | 42 | 45 | 65 |
| Tear strength, lbs./in. | 1.83 | 2.09 | 0.82 | 0.57 | .190 |

(1) Twenty per cent methylene chloride added (based on weight of perpolymer).
(2) Prepolymer mode using the polyol described in Ex. 51; free NCO of 10%.

As seen from the above Table, the MDI and TDR prepolymers provide the resulting rebonded foam with superior physical properties in relation to prepolymers using polymeric MDI. Also, the use of filtration does not appear to substantially increase the properties.

Because of the visual similarity of MDI prepolymers made with polyols having widely varying oxyethylene contents, a laboratory rebonded foam was made with a MDI prepolymer (Example 76) and the polyol of Example 52 (oxyethylene content of 14%). For comparison, a prepolymer having the composition of Example 75 was also tested (Example 77).

The amounts of the shredded foam, water and prepolymer used were as set forth in Examples 71 to 75, and the results were as follows:

TABLE XV

| Example No. | 76 | 77 |
|---|---|---|
| Prepolymer | MDI | TDR |
| Physical Properties of Rebonded Foam | | |
| Density, lbs/ft.³ | 5.60 | 5.55 |
| Tensile Strength, psi. | 3.90 | 8.81 |
| Elongation, % | 40 | 74 |
| Tear strength, lbs./in. | 1.22 | 2.11 |

The rebonded foam made with the TDR prepolymer has superior properties to those utilizing the MDI prepolymer. Indeed, by comparing Example 77 with Examples 71 and 72, it can be seen that the MDI prepolymers made with polyols having oxyethylene contents of 50% provide rebonded foams with properties markedly superior to the rebonded foams of Example 77 wherein the polyol used had an oxyethylene content of 14%.

What is claimed is:

1. A polyurethane prepolymer consisting of the reaction product of (a) an isocyanate selected from the group consisting of tolylene diisocyanate, tolylene diisocyanate residue, diphenylmethane diisocyanate, polymethylene poly-(phenyleneisocyanates), and blends thereof and (b) a polyoxyalkylene polyol having an oxyethylene content of from about 30 to 100 percent by weight, the oxyalkylene groups in the polyol being oxyethylene groups or oxyethylene groups and oxypropylene groups and said prepolymer having a free NCO content of from about 2 to 20 percent by weight, with the proviso that when the oxyethylene content of the polyol is 100 percent by weight the isocyanate is other than tolylene diisocyanate or diphenylmethane diisocyanate and with the further proviso that the prepolymer is a homogeneous solution except when the diisocyanate is diphenylmethane diisocyanate.

2. The prepolymer of claim 1 wherein the free NCO content is from about 5 to 10 percent by weight.

3. The prepolymer of claim 1 wherein the oxyethylene content of the polyol is from about 40 to 70 percent by weight.

4. The prepolymer of claim 1 wherein the isocyanate is tolylene diisocyanate.

5. The prepolymer of claim 1 wherein the isocyanate is tolylene diisocyanate residue.

6. The prepolymer of claim 1 wherein the hydroxyl number of the polyol is from about 30 to 60.

7. The prepolymer of claim 1 wherein the isocyanate is a blend of tolylene diisocyanate and tolylene diisocyanate residue.

8. The prepolymer of claim 7 wherein the free NCO content is from about 5 to 10 percent by weight.

9. The prepolymer of claim 7 wherein the free NCO content is about 10 percent by weight.

10. The prepolymer of claim 7 wherein the oxyethylene content of the polyol is from about 40 to 70 percent by weight.

11. A polyurethane prepolymer that is a homogeneous solution consisting of the reaction product of (a) an isocyanate selected from the group consisting of tolylene diisocyanate, tolylene diisocyanate residue, polymethylene poly(phenlyeneisocyanates), and blends thereof and (b) a polyoxyalkylene polyol having an oxyethylene content of from about 30 to 100 percent by weight, the oxyalkylene groups in the polyol being oxyethylene groups or oxyethylene groups and oxypropylene groups and said prepolymer having a free NCO content of from about 2 to 20 percent by weight, with the proviso that, when the oxyethylene content of the polyol is 100 percent by weight, the isocyanate is other than tolylene diisocyanate.

12. A polyurethane prepolymer that is a homogeneous solution consisting of the reaction product of (a) an isocyanate selected from the group consisting of tolylene diisocyanate residue, polymethylene poly(phenyleneisocyanates), and blends thereof and (b) a polyoxyalkylene polyol having an oxyethylene content of from about 30 to 100 percent by weight, the oxyalkylene groups in the polyol being oxyethylene groups or oxyethylene groups and oxypropylene groups and said prepolymer having a free NCO content of from about 2 to 20 percent by weight.

13. A polyurethane prepolymer that is a homogeneous solution consisting of the reaction product of (a) an isocyanate selected from the group consisting of tolylene diisocyanate, tolylene diisocyanate residue, polymethylene poly(phenlyeneisocyanates), and blends thereof and (b) a polyoxyalkylene polyol having an oxyethylene content of from about 30 to 70 percent by weight, the oxyalkylene groups in the polyol being oxyethylene groups and oxypropylene groups and said prepolymer having a free NCO content of from about 2 to 20 percent by weight.

14. A rebonded polyurethane foam comprising a block of foam particles having dimensional stability and said particles being bonded together by a cured polyurethane prepolymer, said prepolymer consisting of the reaction product of (a) an isocyanate selected from the group consisting of tolylene diisocyanate, tolylene diisocyanate residue, diphenylmethane diisocyanate, polymethylene poly(phenyleneisocyanates), and blends thereof and (b) a polyoxyalkylene polyol having an oxyethylene content of from about 30 to 100 percent by weight, the oxyalkylene groups in the polyol being oxyethylene groups or oxyethylene groups and oxypropylene groups and said prepolymer having a free NCO content, prior to curing, of from about 2 to 20 percent by weight and being present in an amount of no more than about 6 percent based on the total weight of the block constituent including the prepolymer.

15. The foam of claim 14 wherein the oxyethylene content of the polyol is from about 40 to 70 percent by weight.

16. The foam of claim 14 wherein the isocyanate is tolylene diisocyanate.

17. The foam of claim 14 wherein the isocyanate is tolylene diisocyanate residue.

18. The foam of claim 14 wherein the isocyanate is a blend of tolylene diisocyanate and tolyene diisocyanate residue.

19. The foam of claim 18 wherein the oxyethylene content of the polyol is from about 40 to 70 percent by weight.

20. The foam of claim 18 wherein the hydroxyl number of the polyol is from about 30 to 60.

21. A method of forming a rebonded polyurethane foam having dimensional stability from foam particles which comprises blending the foam particles, introducing, during the blending, a polyurethane prepolymer consisting of the reaction product of (a) an isocyanate selected from the group consisting of tolylene diisocyanate, tolylene diisocyanate residue, diphenylmethane diisocyanate, polymethylene poly(phenyleneisocyanates), and blends thereof and (b) a polyoxyalkylene polyol having an oxyethylene content of from about 30 to 100 percent by weight, the oxyalkylene groups in the polyol being oxyethylene groups or oxyethylene groups and oxypropylene groups and said prepolymer having a free NCO content of from about 2 to 20 percent by weight and being present in an amount of no more than about 6 percent based on the total weight of the block constituent including the prepolymer, compressing the foam particles and prepolymer blend to form a block of the desired dimensions, curing the foam particles and prepolymer to the extent that said block has dimensional stability and removing the resulting block from compression.

* * * * *